(12) United States Patent
Moore et al.

(10) Patent No.: US 10,982,809 B2
(45) Date of Patent: Apr. 20, 2021

(54) GAS CYLINDER LINING

(71) Applicant: Ideal Calibrations, LLC, Melvindale, MI (US)

(72) Inventors: Ferrel D. Moore, Lincoln Park, MI (US); James Robert Moore, Lincoln Park, MI (US)

(73) Assignee: Ideal Calibrations, LLC, Melvindale, MI (US)

( * ) Notice: Subject to any disclaimer, the term of this patent is extended or adjusted under 35 U.S.C. 154(b) by 208 days.

(21) Appl. No.: 16/038,996

(22) Filed: Jul. 18, 2018

(65) Prior Publication Data

US 2019/0063681 A1    Feb. 28, 2019

Related U.S. Application Data

(60) Provisional application No. 62/533,831, filed on Jul. 18, 2017.

(51) Int. Cl.
| | | |
|---|---|---|
| *B32B 1/02* | (2006.01) | |
| *F17C 1/00* | (2006.01) | |
| *B32B 15/08* | (2006.01) | |
| *B32B 15/18* | (2006.01) | |
| *B32B 15/20* | (2006.01) | |
| *B32B 27/28* | (2006.01) | |

(52) U.S. Cl.
CPC .................. *F17C 1/00* (2013.01); *B32B 1/02* (2013.01); *B32B 15/08* (2013.01); *B32B 15/18* (2013.01); *B32B 15/20* (2013.01); *B32B 27/28* (2013.01); *F17C 1/005* (2013.01); *B32B 2307/7242* (2013.01); *F17C 2201/0104* (2013.01); *F17C 2201/0109* (2013.01); *F17C 2203/0604* (2013.01); *F17C 2203/0607* (2013.01); *F17C 2203/0639* (2013.01); *F17C 2203/0646* (2013.01); *F17C 2203/0675* (2013.01); *F17C 2205/0332* (2013.01); *F17C 2260/036* (2013.01); *F17C 2260/044* (2013.01)

(58) Field of Classification Search
CPC ............... B32B 1/02; F17C 1/005; F17C 1/00
See application file for complete search history.

(56) References Cited

FOREIGN PATENT DOCUMENTS

CN          103556116 A      5/2014

*Primary Examiner* — Walter Aughenbaugh
(74) *Attorney, Agent, or Firm* — Quinn IP Law

(57) ABSTRACT

An improved gas cylinder configured to prevent degradation of a contained pressurized reactive gas includes a metallic gas cylinder configured to store a pressurized reactive gas within the cylinder. The improved gas cylinder further includes a cylinder lining including parylene. In one embodiment, the parylene lined cylinder can be heat treated. The improved gas cylinder prevents cracking of the cylinder lining, thereby preventing the contained reactive gas from coming into contact with the metallic gas cylinder.

5 Claims, 4 Drawing Sheets

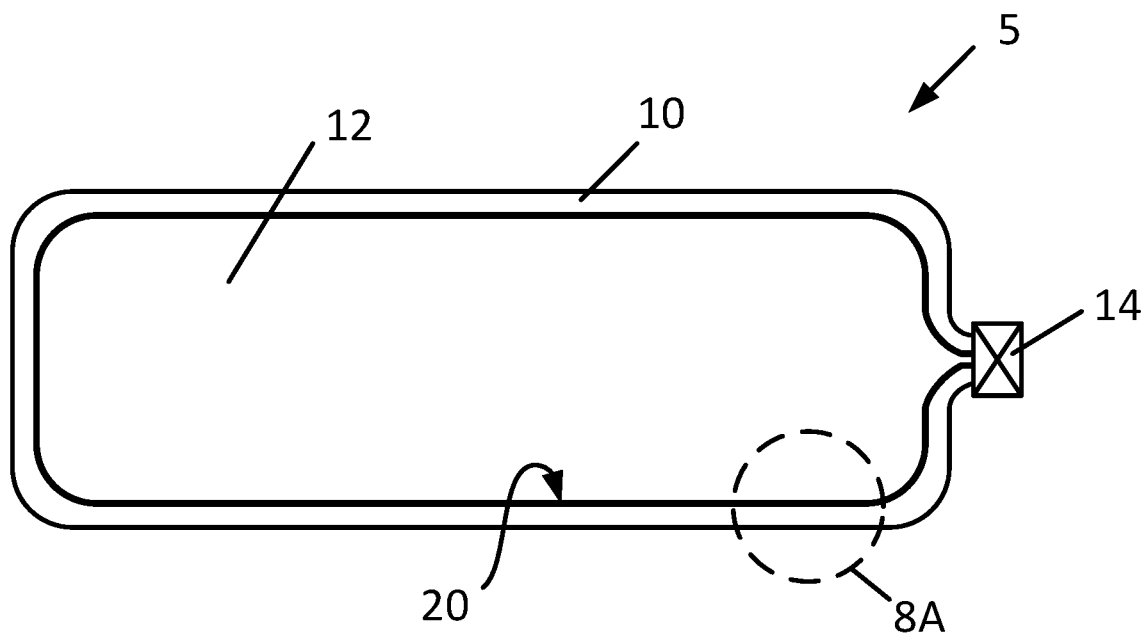
PRIOR ART  FIG. 1
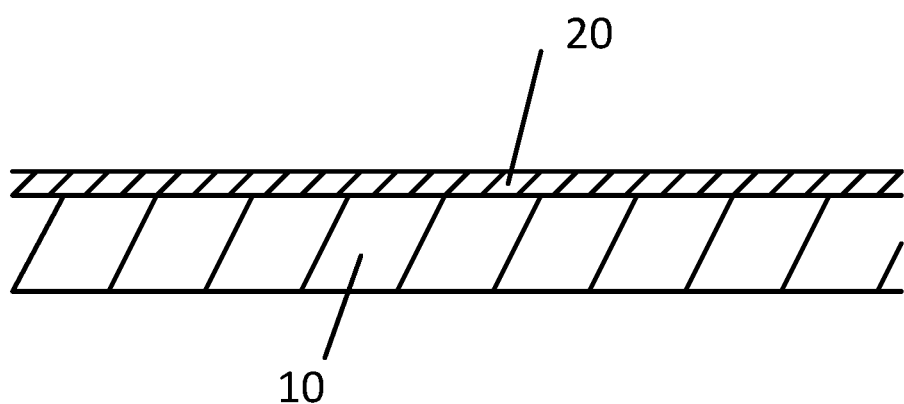
PRIOR ART  FIG. 2

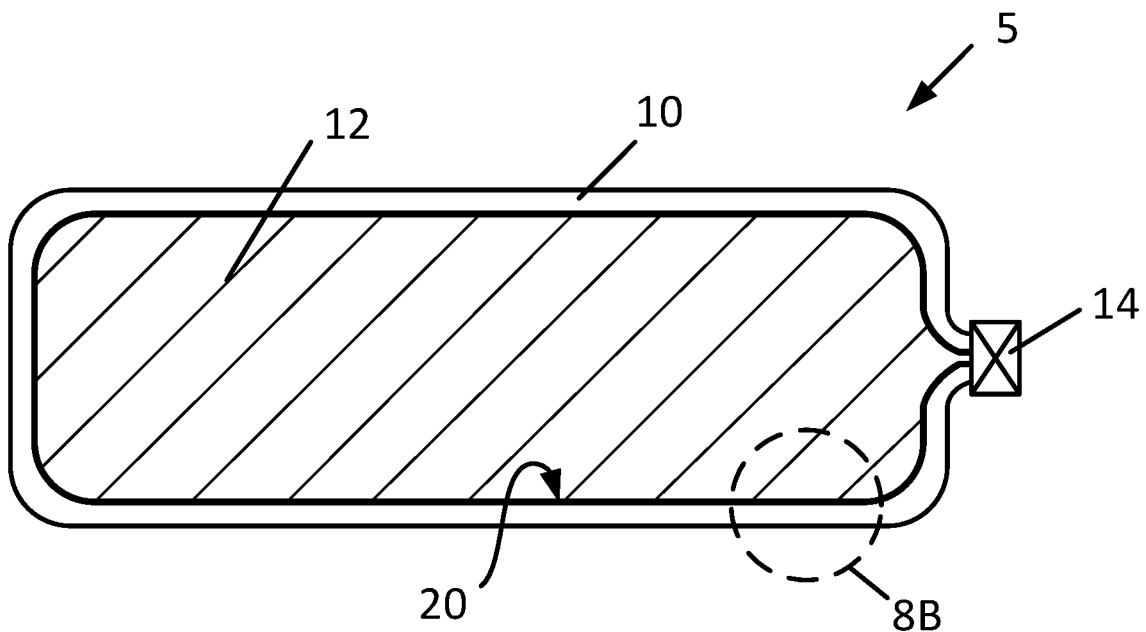
PRIOR ART　　　　FIG. 3
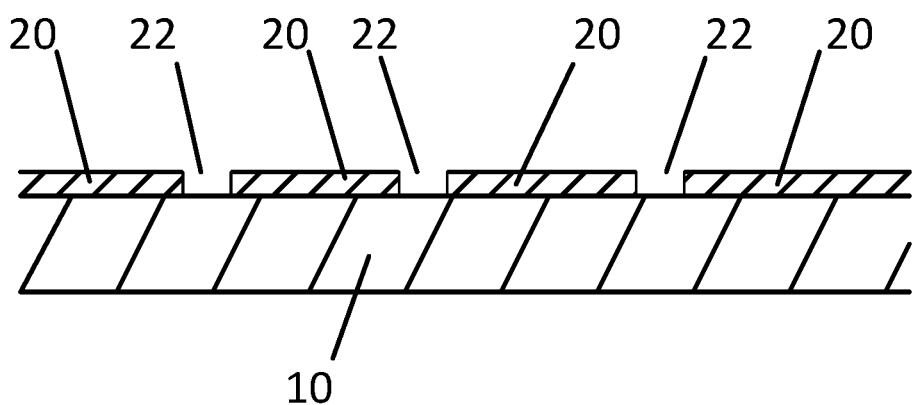
PRIOR ART　　　　FIG. 4

GAS CYLINDER LINING

CROSS-REFERENCE TO RELATED APPLICATIONS

This disclosure claims priority from U.S. Provisional Application No. 62/533,831 filed on Jul. 18, 2017 which is hereby incorporated by reference.

TECHNICAL FIELD

This disclosure is related to a stable gas cylinder lining that resists cracking and degradation as dimensions of the gas cylinder changes with variations in cylinder pressure.

BACKGROUND

The statements in this section merely provide background information related to the present disclosure. Accordingly, such statements are not intended to constitute an admission of prior art.

Gas cylinders are used to store gases under pressure. The stored gases have distinct chemical properties. These chemical properties can be important to maintain constant. Degradation of these chemical properties can lead to contamination or dilution of the gas being stored. This degraded stored gas may no longer be useful for a desired purpose.

Gas cylinders are typically made of metal, for example, steel. Some stored gases react with the metal of the cylinder. Linings are known to be applied to an inside of the gas cylinder to act as a barrier, preventing the stored gas from reacting with the metal of the cylinder. However, conventional linings can crack and degrade over pressurization cycles of the cylinder, exposing the contained gas to the metal of the cylinder.

SUMMARY

An improved gas cylinder configured to prevent degradation of a contained pressurized reactive gas includes a metallic gas cylinder configured to store a pressurized reactive gas within the cylinder. In one embodiment, the parylene lined cylinder can be heat treated. The improved gas cylinder further includes an improved cylinder lining including parylene.

BRIEF DESCRIPTION OF THE DRAWINGS

One or more embodiments will now be described, by way of example, with reference to the accompanying drawings, in which:

FIG. 1 illustrates an exemplary known gas cylinder with a known lining material, in accordance with the present disclosure;

FIG. 2 illustrates in magnified detail the known cylinder wall and the known lining material of FIG. 1, in accordance with the present disclosure;

FIG. 3 illustrates the gas cylinder of FIG. 1 in a stressed state, in accordance with the present disclosure;

FIG. 4 illustrates in magnified detail the known cylinder wall and the known lining material of FIG. 3, with exemplary cracks forming in the lining material, in accordance with the present disclosure;

DETAILED DESCRIPTION

Figure 5:
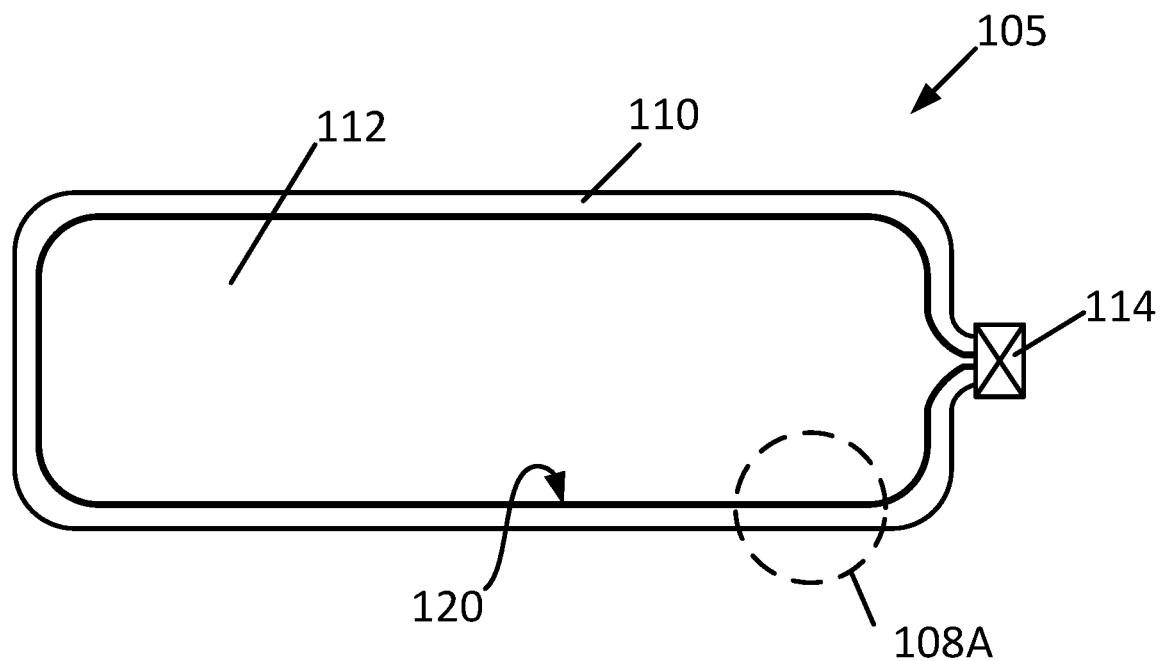
FIG. 5 illustrates an exemplary gas cylinder with an improved lining material, in accordance with the present disclosure.

An improved gas cylinder lining material can prevent the contained gas within the cylinder from coming into contact with the metallic material of the cylinder wall, thereby preventing degradation of the contained gas. An improved cylinder lining can include a material with the following properties: 1) being inert or substantially inert with gases intended to be stored in the cylinder and 2) being capable of being expanded and contracted as cylinder goes through pressurization cycles.

Test gas cylinders are a subset of gas cylinders. Test gas cylinders are typically smaller than normal gas cylinders. Test gas cylinders include a safety relief device, such as a solder plug or a frangible disk. If a gas of a particular composition is provided within the test gas cylinder at a certain pressure, the test gas cylinder will deliver a particular concentration of the gas at the outlet of the valve or nozzle of the test gas cylinder. For example, a test gas cylinder can be calibrated to deliver 10 parts per million (PPM) of hydrogen sulfide to test and calibrate electronic hydrogen sulfide detector devices. Such a detector device can be required to register a certain reading at a particular concentration of the test gas, and a test gas cylinder can be used to test and/or calibrate the detector device. However, if cracks or micro-cracks form in a lining of the test gas cylinder, the hydrogen sulfide can break down or bond with the metal of the test gas cylinder, thereby changing the composition of the gas being delivered from the test gas cylinder. In such an instance, the test gas cylinder calibrated to deliver 10 PPM of hydrogen sulfide may only deliver 8 PPM. The disclosed improved lining prevents this degradation from occurring by acting as a durable barrier, preventing the test gas contained in the test gas cylinder from reacting with the metal of the test gas cylinder.

Test gas cylinders are typically small. The smallest tend to be roughly the size of a first and contain 8-10 gas liters of a test gas. The largest tend to be roughly 18 inches long and contain around 850 gas liters of test gas. Typical, average test gas cylinders include models configured to hold 34 gas liters, 58 gas liters, and 116 gas liters.

One exemplary material that can be used for lining a cylinder is parylene. Parylene is a vapor deposited polymer used as a moisture and dielectric barrier. Testing has shown that it is highly resistant to stresses related to pressurization and pressure and temperature cycles.

There are different forms of parylene. Parylene C is well known. The methods and physical devices described herein work well with parylene C. Other types of parylene have been tested and work similarly to parylene C. The methods and devices of the disclosure are not intended to be limited to any particular type of parylene.

Parylene coatings can be different thicknesses. Testing has shown that a parylene coating of between 6 mils and 10 mils (or 0.006 to 0.010 inches) can be beneficial. Thicknesses of 4 mils were tested and found to be not quite as effective barriers as the 6 to 10 mil range.

Parylene can be applied and used without a heat treatment. However, testing has shown that the parylene becomes a much more effective and durable barrier if it is heated or baked after it is applied to the cylinder. The cylinder is not yet charged with a test gas when the cylinder lined with parylene is heated. Testing has shown benefits to the barrier properties begin when the parylene is heated to at least 60° C. Parylene forms an excellent barrier when heated to 150-160° C., however, the other components of many gas test cylinders cannot be heated to those temperatures. Test gas cylinders made with aluminum and using a solder plug can be heated to 75° C. However for sustained heating with consistent barrier properties without any risk of damage to the gas test cylinder where the gas test cylinder includes a temperature sensitive component such as an aluminum cylinder wall, a solder plug, or a frangible disk made of aluminum, testing has shown heating the gas test cylinders to 68.3° C. is one preferred method of creating the improved gas cylinder. When a cylinder is instead constructed with steel and without a safety relief device, testing has shown that heating the parylene to temperatures between 60° C. and 160° C. is another preferred method of creating the improved gas cylinder. The parylene can be heated based upon protecting the most temperature sensitive component of the gas cylinder. According to these processes, one can say that the gas cylinders include a heat treated parylene lining.

Parylene is deposited using a process called vapor deposition. Cylinders are placed into a chamber specially designed for the process of layering the parylene on the surface and inside of the cylinder. These cylinders are then heated in an oven, for example, to 68.3 degrees Celsius. This changes the coating and increases the efficacy of the parylene as a barrier to gases. This temperature can be raised higher in some embodiments to even more thoroughly increase the barrier ever, certain embodiments of cylinders including some disposable cylinders cannot be heated higher than that due to warping and degradation of their pressure holding capabilities.

A number of reactive gases that can benefit from the disclosed improved cylinder lining include but are not limited to $H_2S$, $NO_2$, $NH_3$, $Cl_2$, HCN, NO, $SO_2$, Formaldehyde, HCl, ETO ($C_2H_4O$ or Ethylene Oxide), $CH_3SH$ (Methyl Mercaptan), and $PH_3$.

Gas cylinders with known linings are stressed by any of a number of conditions. Repeated cycling of pressures can cause cracks or micro-cracks to form in the known lining materials. However, even a single pressurization of a gas cylinder can cause cracking. Further, many gas cylinder owners charge and recharge "disposable gas cylinders" during internal processes such as conditioning. Such devices are typically subject to pressure cycling despite their name implying that they are only charged once. Further, temperature changes or temperature cycling can cause cracking or micro-cracking.

FIG. 1 illustrates an exemplary known gas cylinder with a known lining material. Known gas cylinder 5 is illustrated including cylinder wall 10, cylinder valve 14, and known cylinder lining 20. View 8A defines a portion of the cylinder wall 10 and known cylinder lining 20 to be illustrated in FIG. 2. Interior 12 of cylinder 5 is illustrated in FIG. 1 in an unpressurized, unstressed state.

FIG. 2 illustrates in magnified detail the known cylinder wall and the known lining material of FIG. 1. Cylinder wall 10 and cylinder lining 20 are illustrated in magnified detail as defined in view 8A of FIG. 1. It will be appreciated that the lining can be thinner or thicker than illustrated in comparison to the cylinder wall thickness. In the unstressed state of FIG. 2, the known cylinder lining operates as intended, providing a barrier between contents of the cylinder and the metallic material of the cylinder wall.

FIG. 3 illustrates the gas cylinder of FIG. 1 in a stressed state, with exemplary cracks forming in the lining material. Known gas cylinder 5 is illustrated including cylinder wall 10, cylinder valve 14, and known cylinder lining 20. View 8B defines a portion of the cylinder wall 10 and known cylinder lining 20 to be illustrated in FIG. 4. Interior 12 of cylinder 5 is illustrated in FIG. 3 in a stressed, pressurized state. The stressed state of the cylinder can be a result of pressurization, temperature changes, pressure cycling, and/or other similar stresses.

FIG. 4 illustrates in magnified detail the known cylinder wall and the known lining material of FIG. 3, with exemplary cracks forming in the lining material. FIG. 4 shows cracks 22 forming in cylinder lining 20. These cracks expose a gas stored within interior 12 to the metallic material of cylinder wall 10. If the gas contained within the cylinder can react with the material of cylinder wall 10, degradation of the gas can occur.

FIG. 5 illustrates an exemplary gas cylinder with an improved lining material. Gas cylinder 105 is illustrated including cylinder wall 110, cylinder valve 114, and improved cylinder lining 120. View 108A defines a portion of the cylinder wall 110 and cylinder lining 120 to be illustrated in FIG. 6. Interior 112 of cylinder 105 is illustrated in FIG. 5 in an unstressed, unpressurized state.

Cylinder lining 120 includes a material with properties including 1) being inert or substantially inert with gases intended to be stored in the cylinder and 2) being capable of being expanded and contracted as cylinder goes through pressurization cycles. One exemplary material that can be used for lining 120 is parylene.

Figure 6:
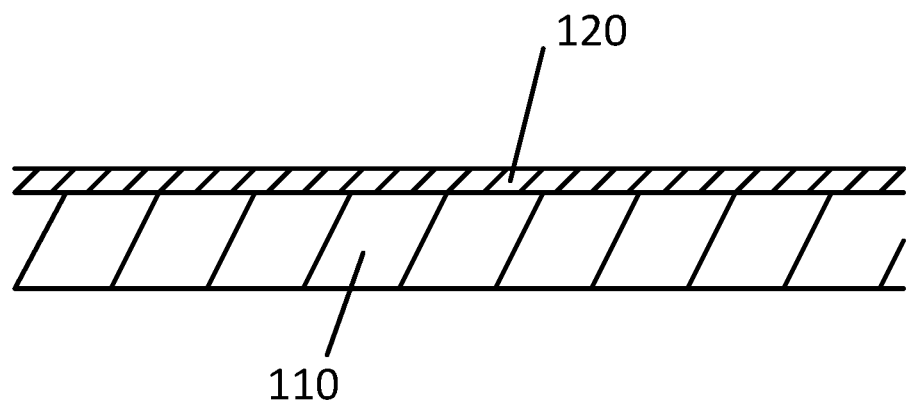
FIG. 6 illustrates in magnified detail the cylinder wall and the improved lining material of FIG. 5, in accordance with the present disclosure.

FIG. 6 illustrates in magnified detail the cylinder wall and the improved lining material of FIG. 5. It will be appreciated that the lining can be thinner or thicker than illustrated in comparison to the cylinder wall thickness. In the unstressed state of FIG. 6, the known cylinder lining operates as intended, providing a barrier between contents of the cylinder and the metallic material of the cylinder wall.

Figure 7:
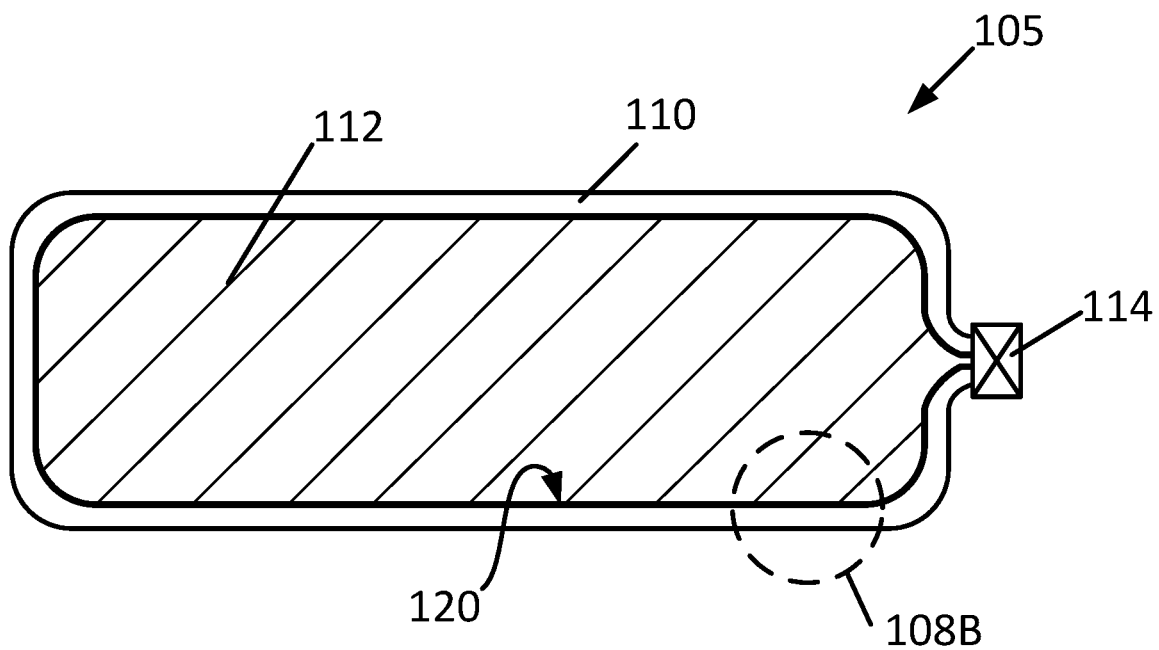
FIG. 7 illustrates the gas cylinder of FIG. 3 in a stressed state, in accordance with the present disclosure.

FIG. 7 illustrates the gas cylinder of FIG. 5 under pressure in a stressed state, with the lining material remaining intact. Gas cylinder 105 is illustrated including cylinder wall 110, cylinder valve 114, and improved cylinder lining 120. View 108B defines a portion of the cylinder wall 110 and cylinder lining 120 to be illustrated in FIG. 8. Interior 112 of cylinder 105 is illustrated in FIG. 7 in a pressurized, stressed state.

Figure 8:
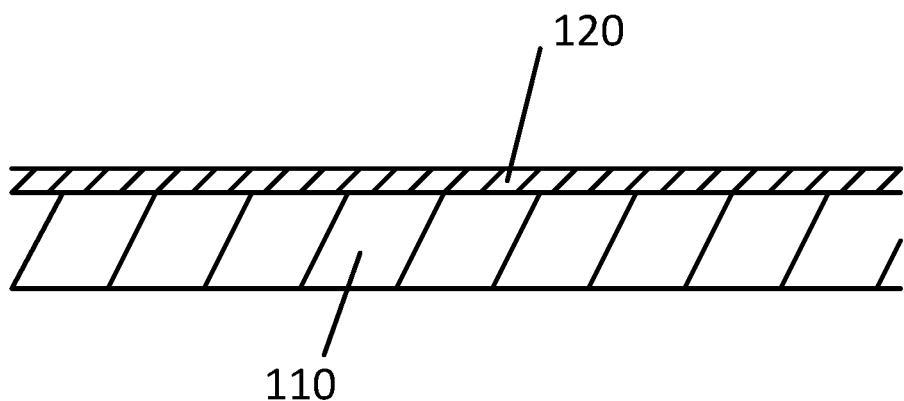
FIG. 8 illustrates in magnified detail the cylinder wall and the improved lining material of FIG. 7 with the lining material remaining intact even while in the stressed state, in accordance with the present disclosure.

FIG. 8 illustrates in magnified detail the cylinder wall and the improved lining material of FIG. 7 with the lining material remaining intact and continuing to function as intended even while in the stressed state. FIG. 8 shows improved cylinder lining 120 intact without any cracks forming and preventing any of the contained gas from contacting cylinder wall 110.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An improved gas cylinder comprises:
   a metallic gas cylinder configured to store a pressurized gas within the cylinder; and
   a cylinder lining upon an interior surface of the metallic gas cylinder comprising parylene, wherein the cylinder lining has been heated to a temperature of at least 60 degrees Celsius.

2. The improved gas cylinder of claim 1, wherein the gas cylinder comprises a temperature sensitive component comprising one of an aluminum cylinder wall, a solder plug, and a frangible disk; and
   wherein the cylinder lining has been heated to a temperature of at least 68.3 degrees Celsius.

3. The improved gas cylinder of claim 1, wherein the gas cylinder comprises a steel cylinder wall; and
   wherein the cylinder lining has been heated to a temperature of between 60 and 160 degrees Celsius.

4. The improved gas cylinder of claim 1, wherein the cylinder lining comprises parylene C.

5. An improved gas cylinder comprises:
   a steel gas cylinder configured to store a pressurized gas within the cylinder; and
   a cylinder lining upon an interior surface of the steel gas cylinder comprising parylene, wherein the cylinder lining has been heated to a temperature of between 60 degrees Celsius and 160 degrees Celsius.

* * * * *